United States Patent
Lim et al.

(10) Patent No.: US 12,444,742 B2
(45) Date of Patent: Oct. 14, 2025

(54) POSITIVE ELECTRODE ACTIVE MATERIAL AND LITHIUM SECONDARY BATTERY INCLUDING THE SAME

(71) Applicant: ECOPRO BM CO., LTD., Cheongju-si (KR)

(72) Inventors: Ra Na Lim, Cheongju-si (KR); A Reum Yang, Cheongju-si (KR); Gyun Joong Kim, Cheongju-si (KR); Kyung Min Lim, Cheongju-si (KR); Hye Bin Kim, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 293 days.

(21) Appl. No.: 18/309,018

(22) Filed: Apr. 28, 2023

(65) Prior Publication Data

US 2023/0268497 A1 Aug. 24, 2023

Related U.S. Application Data

(63) Continuation of application No. PCT/KR2021/016129, filed on Nov. 8, 2021.

(30) Foreign Application Priority Data

Dec. 4, 2020 (KR) .................. 10-2020-0168858
May 25, 2021 (KR) .................. 10-2021-0067237
(Continued)

(51) Int. Cl.
*H01B 1/08* (2006.01)
*C01G 45/1228* (2025.01)
(Continued)

(52) U.S. Cl.
CPC ........ *H01M 4/525* (2013.01); *C01G 45/1228* (2013.01); *C01G 53/50* (2013.01);
(Continued)

(58) Field of Classification Search
CPC .......... H01B 1/00; H01B 1/08; H01M 4/505; H01M 4/525; C01G 53/50
See application file for complete search history.

(56) References Cited

U.S. PATENT DOCUMENTS 10,950,856 B2 * 3/2021 Park .................. H01M 4/505
2020/0321610 A1 * 10/2020 Lee .................... C01G 53/00

FOREIGN PATENT DOCUMENTS

| JP | 2011-096650 A | 5/2011 |
| JP | 2011-134670 A | 7/2011 |

(Continued)

OTHER PUBLICATIONS

English language translation of form PCT/ISA/237 (mailed Feb. 2022).*

(Continued)

*Primary Examiner* — Mark Kopec
(74) *Attorney, Agent, or Firm* — Studebaker Brackett PLLC

(57) ABSTRACT

The present invention relates to a positive electrode active material and a lithium secondary battery including the same, and more particularly, to a positive electrode active material, which includes an overlithiated lithium manganese-based oxide, which is a solid solution with a phase belonging to a C2/m space group and a phase belonging to an R3-m space group and in which stability degradation caused by excessive amounts of lithium and manganese in the lithium manganese-based oxide is mitigated and/or prevented because there are regions with different proportions of the phase belonging to the C2/m space group and the phase belonging to the R3-m space group in the lithium manganese-based oxide, and a lithium secondary battery including the same.

10 Claims, 2 Drawing Sheets

(30) Foreign Application Priority Data

| | | | |
|---|---|---|---|
| Jun. 21, 2021 | (KR) | ........................ | 10-2021-0080132 |
| Jun. 21, 2021 | (KR) | ........................ | 10-2021-0080133 |
| Oct. 18, 2021 | (KR) | ........................ | 10-2021-0138123 |
| Oct. 27, 2021 | (KR) | ........................ | 10-2021-0144259 |
| Oct. 28, 2021 | (KR) | ........................ | 10-2021-0145310 |

(51) Int. Cl.
    *C01G 53/50*      (2025.01)
    *H01M 4/131*      (2010.01)
    *H01M 4/36*      (2006.01)
    *H01M 4/505*      (2010.01)
    *H01M 4/525*      (2010.01)
    *H01M 10/052*      (2010.01)
    *H01M 4/02*      (2006.01)

(52) U.S. Cl.
CPC .............. *H01B 1/08* (2013.01); *H01M 4/131* (2013.01); *H01M 4/366* (2013.01); *H01M 4/505* (2013.01); *H01M 10/052* (2013.01); *C01P 2002/01* (2013.01); *C01P 2004/04* (2013.01); *C01P 2006/40* (2013.01); *H01M 2004/021* (2013.01); *H01M 2004/028* (2013.01)

(56) References Cited

FOREIGN PATENT DOCUMENTS

| JP | 2012-174642 A | 9/2012 |
|---|---|---|
| JP | 2016-033848 A | 3/2016 |
| JP | 2016-072179 A | 5/2016 |
| KR | 10-2014-0008344 A | 1/2014 |
| KR | 10-2014-0034606 A | 3/2014 |
| KR | 10-2017-0141130 A | 12/2017 |

OTHER PUBLICATIONS

Aravindan et al "Overlithiated Li1+xNi0.5Mn1.5O4 in all one dimensional architecture with conversion type a-Fe2O3: A new approach to eliminate irreversible capacity loss", Electrochimica Acta 215 (2016) 647-651.*
Betz et al "An Approach for Pre-Lithiation of Li1+xNi0.5Mn1.5O4 Cathodes Mitigating Active Lithium Loss", Journal of The Electrochemical Society, 166 (15) A3531-A3538 (2019).*
Choi et al "Effect of lithium content on spinel phase evolution in the composite material LixNi0.25Co0.10Mn0.65O(3.4 + x) / 2 (0.8 ≤ X ≤ 1.6) for Li-ion batteries", Solid State Ionics 293 (2016) 77-84.*
Liu et al "Unraveling the Rapid Performance Decay of Layered High-Energy Cathodes: From Nanoscale Degradation to Drastic Bulk Evolution", ACS Nano 2018, 12, 2708-2718.*
International Search Report issued in PCT/KR2021/016129 mailed Feb. 21, 2022.
An Office Action; "Notice of Reasons for Refusal," mailed by the Japanese Patent Office on Jul. 30, 2024, which corresponds to Japanese Patent Application No. 2023-533618 and is related to U.S. Appl. No. 18/309,018.

* cited by examiner

POSITIVE ELECTRODE ACTIVE MATERIAL AND LITHIUM SECONDARY BATTERY INCLUDING THE SAME

CROSS-REFERENCE TO RELATED APPLICATION

This application is based on the PCT Application No. PCT/KR2021/016129, filed on Nov. 8, 2021, and claims the benefit of priority from the prior Korean Patent Application No. 10-2020-0168858, filed on Dec. 4, 2020, Korean Patent Application No. 10-2021-0067237, filed on May 25, 2021, Korean Patent Application No. 10-2021-0080132, filed on Jun. 21, 2021, Korean Patent Application No. 10-2021-0080133, filed on Jun. 21, 2021, Korean Patent Application No. 10-2021-0138123, filed on Oct. 18, 2021, Korean Patent Application No. 10-2021-0144259, filed on Oct. 27, 2021, and Korean Patent Application No. 10-2021-0145310, filed on Oct. 28, 2021, the disclosures of which are incorporated herein by reference in its entirety.

TECHNICAL FIELD

The present invention relates to a positive electrode active material and a lithium secondary battery including the same, and more particularly, to a positive electrode active material which includes an overlithiated lithium manganese-based oxide, which is a solid solution with a phase belonging to a C2/m space group and a phase belonging to an R3-m space group, and in which stability degradation caused by lithium and manganese in excessive amounts in the lithium manganese-based oxide is mitigated and/or prevented because there are regions with different proportions of the phase belonging to the C2/m space group and the phase belonging to the R3-m space group in the lithium manganese-based oxide, and a lithium secondary battery including the same.

BACKGROUND ART

Batteries store electrical power by using materials facilitating an electrochemical reaction as a positive electrode and a negative electrode. As a representative example of such batteries, there is a lithium secondary battery storing electrical energy by means of a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

As a positive electrode active material of the lithium secondary battery, a lithium composite oxide may be used, and for example, composite oxides such as $LiCoO_2$, $LiMn_2O_4$, $LiNiO_2$, $LiMnO_2$, or a composite oxide in which Ni, Co, Mn or Al is complexed are being studied.

Among the positive electrode active materials, $LiCoO_2$ is most widely used due to excellent lifetime characteristics and charge/discharge efficiency, but it is expensive due to cobalt being a limited resource, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated. Since most of the Li by-products consist of LiOH and $Li_2CO_3$, they may cause gelation in preparation of a positive electrode paste or cause gas generation according to repeated charge/discharge after the manufacture of an electrode. Residual $Li_2CO_3$ not only increases cell swelling to reduce the number of cycles, but also causes the swelling of a battery.

Various candidate materials for compensating for conventional positive electrode active materials are being mentioned.

For example, studies are being conducted to use an overlithiated lithium manganese-based oxide as a positive electrode active material for a lithium secondary battery, in which an excess of Mn among transition metals is included and a lithium content is larger than the sum of the contents of the transition metals. The overlithiated lithium manganese-based oxide is also referred to as an overlithiated layered oxide (OLO).

Although the OLO has an advantage in that it can theoretically exhibit high capacity under a high voltage operation environment, in fact, due to an excessive amount of Mn contained in the oxide, the electrical conductivity is relatively low, and thus the rate capability of a lithium secondary battery using OLO is low. As such, when the rate capability is low, there is a problem in which charge/discharge capacity and lifespan efficiency (capacity retention) are degraded during the cycling of a lithium secondary battery.

In addition, during the cycling of a lithium secondary battery using OLO, a decrease in charge/discharge capacity or voltage decay may be caused by a phase transition caused by the migration of a transition metal in the lithium manganese-based oxide. For example, when a transition metal in a lithium manganese-based oxide having a layered crystal structure migrates in an unintended direction to induce phase transition, spinel or a crystal structure similar thereto may be generated entirely and/or partially in the lithium manganese-based oxide.

To solve the above-described problems, although there are attempts to improve the problems of OLO through structural improvement and surface modification of particles, such as controlling the particle size of OLO or coating the surface of OLO, these attempts do not reach the level of commercialization.

DISCLOSURE

Technical Problem

In the lithium secondary battery market, the growth of lithium secondary batteries for electric vehicles is driving the market, and accordingly, the demand for positive electrode active materials used in lithium secondary batteries is also continuously increasing.

For example, conventionally, to ensure stability, lithium secondary batteries using LFP have mainly been used, but recently, the use of a nickel-based lithium composite oxide having a larger energy capacity per weight than LFP tends to be increasing.

In addition, recently, nickel-based lithium composite oxides mainly used as positive electrode active materials for high-capacity lithium secondary batteries essentially use three-component metal elements such as nickel, cobalt and manganese or nickel, cobalt and aluminum. However, since cobalt is not only unstable in supply, but also excessively expensive compared to other raw materials, a positive electrode active material with a new composition, which can reduce a cobalt content or exclude cobalt is needed.

Considering the aspects, although an overlithiated lithium manganese-based oxide can meet the above-mentioned expectations of the market, it can be said that the electrochemical properties and stability of the lithium manganese-based oxide are still insufficient to replace the commercially available NCM or NCA-type positive electrode active material.

However, compared to other types of commercially available positive electrode active materials, even when the existing overlithiated lithium manganese-based oxides are disadvantageous in terms of electrochemical properties and/or stability, it was confirmed by the present inventors that, when it is possible to control the concentration of a transition metal in the lithium manganese-based oxide by region, an overlithiated lithium manganese-based oxide can also exhibit commercially available levels of electrochemical properties and stability.

Therefore, the present invention is directed to providing a positive electrode active material which includes an overlithiated lithium manganese-based oxide, which is a solid solution with a phase belonging to a C2/m space group and a phase belonging to an R3-m space group, and in which stability degradation caused by lithium and manganese in excessive amounts in the lithium manganese-based oxide is mitigated and/or prevented because there are regions with different proportions of the phase belonging to the C2/m space group and the phase belonging to the R3-m space group in the lithium manganese-based oxide.

In addition, the present invention is directed to providing a positive electrode active material which is able to improve the low discharge capacity and rate capability of the conventional overlithiated lithium manganese-based oxide by allowing an Ni concentration in a region having a phase belonging to an R3-m space group to be in a predetermined range, as a positive electrode active material including an overlithiated lithium manganese-based oxide, which is a solid solution with a phase belonging to a C2/m space group and a phase belonging to an R3-m space group.

Moreover, the present invention is directed to providing a lithium secondary battery which improves the low rate capability of the conventional OLO by using a positive electrode including the positive electrode active material defined in the present invention.

Technical Solution

To solve the above-described technical problems, one aspect of the present invention provides a positive electrode active material including an overlithiated lithium manganese-based oxide containing at least lithium, nickel, and manganese, in which a phase belonging to a C2/m space group and a phase belonging to an R3-m space group coexist in the lithium manganese-based oxide, and there are regions with different proportions of the phase belonging to the C2/m space group and the phase belonging to the R3-m space group in the lithium manganese-based oxide.

In one embodiment, a concentration of metal elements in the lithium manganese-based oxide may satisfy Expression 1 below:

$$0.24 \leq M^2/M^1 \leq 0.55 \qquad \text{[Expression 1]}$$

Wherein, $M^1$ is the number of moles of all metal elements (excluding lithium) in the lithium manganese-based oxide, and $M^2$ is the number of moles of nickel based on all metal elements (excluding lithium) in the lithium manganese-based oxide.

As the content of nickel in the metal elements (excluding lithium) in the lithium manganese-based oxide satisfies Expression 1, it is possible to increase discharge capacity and a rate capability, which are decreased by an excess of Mn in the lithium manganese-based oxide, to commercially available levels.

The lithium manganese-based oxide may be a core-shell particle which includes a core and a shell covering at least a part of the surface of the core. Wherein, the core and shell are distinguished to refer to the regions with different proportions of the phase belonging to the C2/m space group and the phase belonging to the R3-m space group in the lithium manganese-based oxide. That is, although the lithium manganese-based oxide is a core-shell particle, the core and the shell should be understood as forming one solid solution.

When the lithium manganese-based oxide is a core-shell particle, the phase belonging to the C2/m space group and the phase belonging to the R3-m space group coexist in the core, and a ratio of the phase belonging to the R3-m space group to the phase belonging to the C2/m space group in the shell may be higher than that in the core.

Wherein, a concentration of metal elements in the shell may satisfy Expression 3 below:

$$0.24 \leq M^4/M^3 \leq 0.75 \qquad \text{[Expression 3]}$$

Wherein, $M^3$ is the number of moles of all metal elements (excluding lithium) in the shell, and $M^4$ is the number of moles of nickel based on all metal elements (excluding lithium) in the shell.

Wherein, as a ratio of the phase belonging to the R3-m space group to the phase belonging to the C2/m space group in the lithium manganese-based oxide has a gradient increasing from the core to the shell, an abrupt change in the crystal structure in the lithium manganese-based oxide may be reduced and thus damage to particles during charging/discharging may be prevented.

The lithium manganese-based oxide may be represented by Formula 1 below.

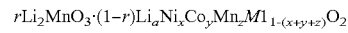    [Formula 1]

Wherein,

M1 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0<r\leq0.8$, $0<a\leq1$, $0<x\leq1$, $0\leq y<1$, $0<z<1$, and $0<x+y+z\leq1$.

As shown in Formula 1, the lithium manganese-based oxide defined herein is a solid solution in which the phase belonging in the C2/m space group and the phase belonging to the R3-m space group coexist in a single particle.

Wherein, the single particle may refer to a "non-aggregated particle including a single primary particle," a "particle formed by aggregating a relatively small number of primary particles" or a "particle formed by aggregating a plurality (tens to hundreds, or more) of primary particles."

In the solid solution represented by Formula 1, the phase belonging to the C2/m space group is derived from $Li_2MnO_3$, and the phase belonging to the phase R3-m space group is derived from $Li_aNi_xCo_yMn_zM1_{1-(x+y+z)}O_2$.

In addition, another aspect of the present invention provides a positive electrode including the above-described positive electrode active material.

Moreover, still another aspect of the present invention provides a lithium secondary battery using the above-described positive electrode.

Advantageous Effects

According to the present invention, compared with a commercially available different type of positive electrode active material, it is possible to improve the limitations of the conventional overlithiated lithium manganese-based oxide, which have several disadvantages in terms of electrochemical properties and/or stability.

First, the lithium manganese-based oxide included in the positive electrode active material according to the present invention is an overlithiated lithium manganese-based oxide, which is a solid solution of a phase belonging to a C2/m space group and a phase belonging to an R3-m space group.

As described above, the lithium manganese-based oxide containing an excess of lithium and manganese may exhibit a high capacity under a high-voltage operating environment. However, while the lithium manganese-based oxide has a disadvantage of low discharge capacity and rate capability due to an excess of lithium and manganese in the oxide, like the positive electrode active material according to the present invention, when the proportions of the phase belonging to the C2/m space group and the phase belonging to the R3-m space group is designed to be different for each region, an effect of improving the discharge capacity and the rate capability is exhibited.

Particularly, when a ratio of the phase belonging to the R3-m space group to the phase belonging to the C2/m space group is high in the surface portion (which can be referred to as a core) of the lithium manganese-based oxide, it is possible to increase the discharge capacity and the rate capability to commercially available levels by improving the low electrical conductivity of the lithium manganese-based oxide by mitigating the charge-transfer and/or diffusion of Li ions on a particle surface (most likely caused by the phase belonging to the C2/m space group).

DESCRIPTION OF DRAWINGS

In FIG. 1, a TEM image at a magnification of 50 nm and a TEM image at a magnification of 5 nm, enlarging a region shown in the TEM image (magnification: 50 nm), and crystal structures confirmed through FFT conversion of region A and region B of the TEM image (magnification: 5 nm) are shown.

MODES OF THE INVENTION

Figure 1:
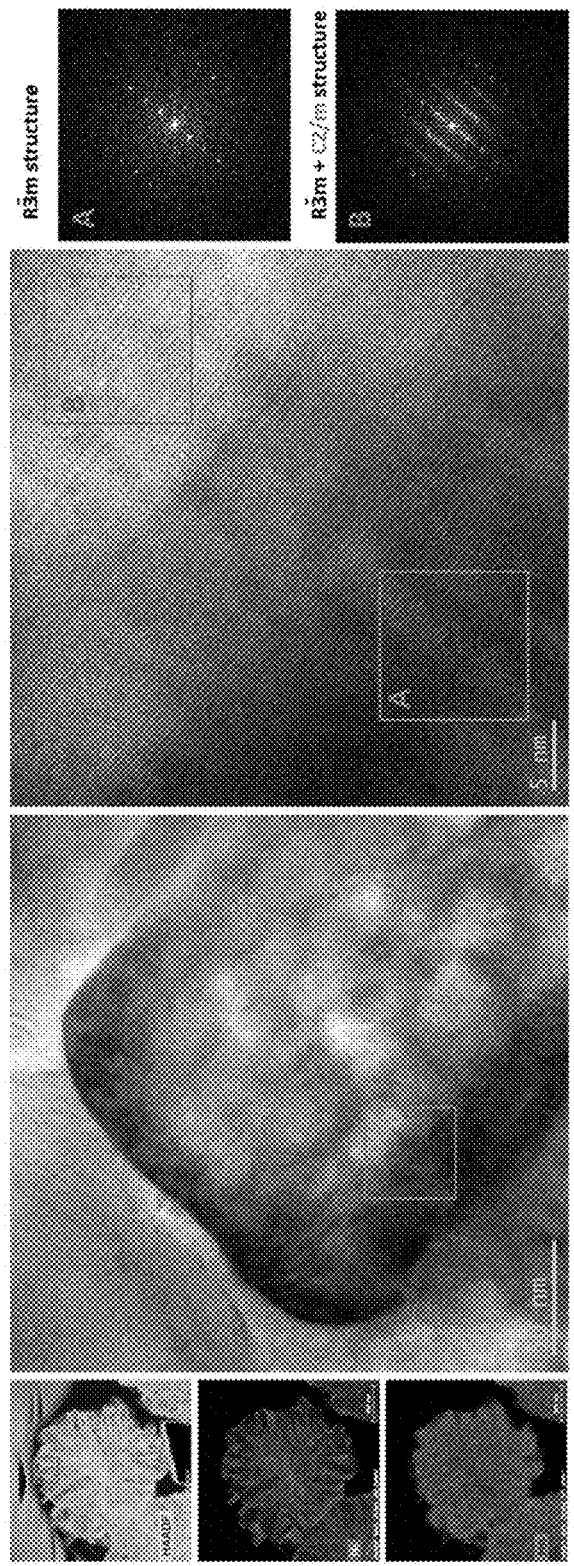
FIG. 1 shows the result of TEM analysis of a lithium manganese-based oxide included in a positive electrode active material according to Example 4.

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode active material including an overlithiated lithium manganese-based oxide containing at least lithium, nickel, manganese and doping metals, and a lithium secondary battery including the positive electrode active material according to the present invention will be described in further detail.

Positive Electrode Active Material

According to one aspect of the present invention, a positive electrode active material including an overlithiated lithium manganese-based oxide containing at least lithium, nickel, manganese and doping metals is provided. The lithium manganese-based oxide is a composite metal oxide capable of intercalation/deintercalation of lithium ions.

The lithium manganese-based oxide included in the positive electrode active material defined herein may be a secondary particle including at least one primary particle.

The "secondary particle including at least one primary particle" used herein should be interpreted to include a "particle formed by aggregating a plurality of primary particles" or a "non-aggregated particle including a single primary particle."

The primary particle and the secondary particle may each independently have a rod shape, an oval shape and/or an irregular shape.

When an average major axis length is used as an indicator indicating the sizes of the primary particle and the secondary particle, the average major axis length of the primary particle constituting the lithium manganese-based oxide may be 0.1 to 5 µm, and the average major axis length of the secondary particle constituting the lithium manganese-based oxide may be 1 to 30 µm. The average major axis length of the secondary particle may vary according to the number of the primary particles constituting the secondary particle, and particles with various average major axis lengths may be included in the positive electrode active material.

When the lithium manganese-based oxide is a "non-aggregated particle including a single primary particle," or a "particle formed by aggregating a relatively small number of primary particles," the size (average particle diameter) of the primary particles included in the "non-aggregated particle including a single primary particle" or the "particle formed by aggregating a relatively small number of primary particles" may be larger than that of the primary particle (average particle diameter) included in a "secondary particle formed by aggregating tens to hundreds or more of primary particles."

Likewise, the lithium manganese-based oxide, which is a "non-aggregated particle including a single primary particle" or "particle formed by aggregating a relatively small number of primary particles," generally requires a stronger thermal treatment condition (high thermal treatment temperature/long-term thermal treatment) compared to the case in which a "secondary particle formed by aggregating tens to hundreds or more of primary particles" is prepared. For example, in the case of long-term thermal treatment at a relatively high temperature (800° C. or more), it is known that particle growth (crystal growth) is promoted to obtain a positive electrode active material in which the size of a single particle increases and the degree of particle aggregation is lowered.

For example, when the lithium manganese-based oxide is a "non-aggregated particle including a single primary particle," or a "particle formed by aggregating a relatively small number of primary particles," the average major axis length of the primary particle may be present in the range of 0.5 to 20 μm. On the other hand, when the lithium manganese-based oxide is a "particle formed by aggregating a plurality (tens to hundreds or more) of primary particles," the average major axis length of the primary particle may be present in the range of 0.1 to 5 μm.

In addition, the primary particle may include at least one crystallite. That is, the primary particle may be present as a particle consisting of a single crystallite or including a plurality of crystallites.

The lithium manganese-based oxide defined herein is a composite metal oxide including an excess of lithium and manganese, in which a phase belonging to a C2/m space group and a phase belonging to an R3-m space group coexist. That is, the lithium manganese-based oxide is a solid solution of a phase belonging to a C2/m space group and a phase belonging to an R3-m space group.

The solid solution used herein refers to the lithium manganese-based oxide in which a phase belonging to a C2/m space group and a phase belonging to an R3-m space group are present in a single particle.

Wherein, the single particle may refer to a "non-aggregated particle including a single primary particle," a "particle formed by aggregating a relatively small number of primary particles," or a "particle formed by aggregating a plurality (tens to hundreds or more) of primary particles."

The solid solution used herein does not refer to a state in which a phase belonging to a C2/m space group and a phase belonging to an R3-m space group in the lithium manganese-based oxide are physically and/or chemically bonded or attached to each other.

For example, a metal oxide having a phase belonging to a C2/m space group whose surface is coated with a metal oxide having a phase belonging to an R3-m space group when mixing the metal oxide having the phase belonging to the C2/m space group with the metal oxide having the phase belonging to the R3-m space group does not correspond to the solid solution.

Meanwhile, there may be regions in which a phase belonging to a C2/m space group and a phase belonging to an R3-m space group coexist in the lithium manganese-based oxide, and which have different proportions of the phase belonging to the C2/m space group and the phase belonging to the R3-m space group.

Likewise, when the proportions of a phase belonging to a C2/m space group and a phase belonging to an R3-m space group in the lithium manganese-based oxide are different for each region, an effect of improving the discharge capacity and rate capability of the positive electrode active material containing the lithium manganese-based oxide may be exhibited.

In addition, the concentration of metal elements in the lithium manganese-based oxide may satisfy Expression 1 below:

$$0.24 \leq M^2/M^1 \leq 0.55 \quad \text{[Expression 1]}$$

Wherein, $M^1$ is the number of moles of all metal elements (excluding lithium) in the lithium manganese-based oxide, and $M^2$ is the number of moles of nickel based on all metal elements (excluding lithium) in the lithium manganese-based oxide.

When $M^2/M^1$ in Expression 1 is more than 0.55, due to the excessively high Ni content in the lithium manganese-based oxide, cation mixing with Li may occur, and it may be difficult for the lithium manganese-based oxide to exhibit the characteristics as an OLO.

As described above, since the lithium manganese-based oxide according to the present invention includes an excess of lithium, when the Ni content in the lithium manganese-based oxide increases, the amount of lithium impurities such as LiOH and $Li_2CO_3$ in the lithium manganese-based oxide may increase due to severe cation mixing. The lithium impurities are a major cause of paste gelation when a positive electrode paste is prepared using a positive electrode active material, or the swelling phenomenon of a cell in charging/discharging after the manufacture of a positive electrode.

On the other hand, when the $M^2/M^1$ in Expression 1 is less than 0.24, due to the insufficient Ni content of the lithium manganese-based oxide, it may be difficult to improve the charge-transfer and/or diffusion of Li ions degraded by an excess of manganese.

That is, as the nickel content in the lithium manganese-based oxide satisfies Expression 1, it is possible to increase discharge capacity and the rate capability, which are degraded by an excess of Mn in the lithium manganese-based oxide, to commercially available levels.

In addition, since nickel in the lithium manganese-based oxide is present in a phase belonging to an R3-m space group and not present in a phase belonging to a C2/m space group, the nickel content in the lithium manganese-based oxide may be expressed as Expression 2 below.

$$0.40 \leq M^{2'}/M^{1'} \leq 0.70 \quad \text{[Expression 2]}$$

Wherein, $M^{1'}$ is the number of moles of all metal elements (excluding lithium) in the phase belonging to the R3-m space group, and $M^{2'}$ is the number of moles of nickel based on all metal elements (excluding lithium) in the phase belonging to the R3-m space group.

When $M^{2'}/M^{1'}$ in Expression 2 is more than 0.70, the Ni content in the phase belonging to the R3-m space group is excessively high, which causes cation mixing, whereas when $M^{2'}/M^{1'}$ in Expression 2 is less than 0.40, as the Ni content in the phase belonging to the R3-m space group is insufficient and an excess of manganese is present, the charge-transfer and/or diffusion of Li ions may be degraded.

The lithium manganese-based oxide may be a core-shell particle that includes a core and a shell covering at least a part of the surface of the core.

Wherein, the core and the shell are distinguished to refer to regions with different proportions of the phase belonging to the C2/m space group and the phase belonging to the R3-m space group in the lithium manganese-based oxide. That is, although the lithium manganese-based oxide is a core-shell particle, the core and the shell should be understood as forming one solid solution.

Wherein, the shell (or surface) and core (or center) of a particle may be distinguished by the concentration of any metal element present in a corresponding region, or as to described below, distinguished by a ratio of phases (crystal structures) present in the corresponding region.

The shell may occupy at least a part of the surface of the core. That is, the shell may be partially present on the surface of the core, or occupy the entire surface of the core.

Meanwhile, when the radius of the core-shell particle is r, the thickness of the shell may be 0.001 to 0.9r, but the present invention is not necessarily limited thereto, and as described above, the core and shell may be distinguished by the concentration of any metal element present in a corresponding region, or as to described below, distinguished by the ratio of phases (crystal structures) present in the corresponding region.

In one embodiment, a region in which a phase belonging to an R3-m space group is predominantly present may be present in the lithium manganese-based oxide. That is, when the proportion of a phase belonging to an R3-m space group in the region in which a phase belonging to a C2/m space group and the phase belonging to the R3-m space group coexist in the lithium manganese-based oxide is higher than that of the phase belonging to the C2/m space group in the lithium manganese-based oxide, the region may be defined as a region in which the phase belonging to the R3-m space group is predominantly present.

For example, when the lithium manganese-based oxide is a core-shell particle, the phase belonging to the C2/m space group and the phase belonging to the R3-m space group coexist in the core and shell, but a ratio of the phase belonging to the R3-m space group to the phase belonging to the C2/m space group in the core and a ratio of the phase belonging to the R3-m space group to the phase belonging to the C2/m space group in the shell may be different. Wherein, in any one region of the core and the shell, the phase belonging to the R3-m space group may be predominantly present.

In addition, when the phase belonging to the C2/m space group and the phase belonging to the R3-m space group coexist in the core and shell of the lithium manganese-based oxide, the ratio of the phase belonging to the R3-m space group to the phase belonging to the C2/m space group in the shell is preferably higher than that of the phase belonging to the R3-m space group to the phase belonging to the C2/m space group in the core. The ratio of the phase of belonging to the R3-m space group to the phase belonging to the C2/m space group in the core and shell may be confirmed from the Ni contents in the core and shell.

In another embodiment, when the lithium manganese-based oxide is a core-shell particle, although the phase belonging to the C2/m space group and the phase belonging to the R3-m space group coexist in the core, there may be only the phase belonging to the R3-m space group in the shell.

In the above-described core-shell particles according to various embodiments, the concentration of metal elements in the shell may satisfy Expression 3 below.

$$0.24 \leq M^4/M^3 \leq 0.75 \quad \text{[Expression 3]}$$

Wherein, $M^3$ is the number of moles of all metal elements (excluding lithium) in the shell, and $M^4$ is the number of moles of nickel based on all metal elements (excluding lithium) in the shell.

In addition, since nickel in the lithium manganese-based oxide is present in the phase belonging to the R3-m space group and not present in the phase belonging to the C2/m space group, the content of nickel in the shell may not be expressed as Expression 4 below.

$$0.40 \leq M^{4'}/M^{3'} \leq 0.75 \quad \text{[Expression 4]}$$

Wherein, $M^{3'}$ is the number of moles of all metal elements (excluding lithium) in the phase belonging to the R3-m space group in the shell, and $M^{4'}$ is the number of moles of nickel based on all metal elements (excluding lithium) in the phase belonging to the R3-m space group in the shell.

When the $M^4/M^3$ or $M^{4'}/M^{3'}$ in Expression 3 or 4 exceeds 0.75, the content of Ni in the phase belonging to the R3-m space group is excessively large, and thus cation mixing with Li may occur, whereas when $M^4/M^3$ in Expression 3 is smaller than 0.24, or $M^{4'}/M^{3'}$ in Expression 4 is smaller than 0.40, the content of Ni in the phase belonging to the R3-m space group is insufficient and manganese is excessively present, thereby degrading the charge-transfer and/or diffusion of Li ions.

In the case of the above-described core-shell particles according to various embodiments, as the phase belonging to the C2/m space group and the phase belonging to the R3-m space group coexist in the core of the lithium manganese-based oxide, the phase belonging to the R3-m space group may partially offset the instability of the phase belonging to the C2/m space group.

In addition, as the phase belonging to the R3-m space group is predominantly present in the shell of the lithium manganese-based oxide, unlike the conventional lithium manganese-based oxide, it is possible to mitigate the charge-transfer and/or diffusion of Li ions on the surface of a particle most likely caused by the phase belonging to the C2/m space group.

In addition, it is well known that, in the case of an overlithiated lithium manganese-based oxide containing an excess of Mn has a lower electrical conductivity than LCO, or NCM or NCA containing an excess of Ni. In addition, even in general NCM, there is a problem that electrical conductivity decreases as the Mn content increases.

On the surface of the positive electrode active material, various reactions may occur, and as the Mn content in the positive electrode active material increases, the charge-transfer and/or diffusion of Li ions on the surface may be hindered, which may be referred to as degradation of surface kinetics or surface reaction kinetics.

In addition, the ratio of the phase belonging to the R3-m space group to the phase belonging to the C2/m space group in the lithium manganese-based oxide may have a gradient that increases from the core to the shell.

As the gradient of the ratio of the phase belonging to the R3-m space group to the phase belonging to the C2/m space group is formed to increase from the core to the shell, an abrupt change in crystal structure between the core and the shell may be reduced, and it may allow the phase belonging to the C2/m space group and the phase belonging to the R3-m space group in the lithium manganese-based oxide to stably form a solid solution.

When there are abrupt changes in the phase belonging to the C2/m space group and the phase belonging to the R3-m space group in the lithium manganese-based oxide, during cycling, a transition metal in the lithium manganese-based oxide may migrate in an unintended direction, resulting in phase transition (a change in crystal structure).

As described above, the surface kinetics of the lithium manganese-based oxide may be improved by allowing the region in which the phase belonging to the R3-m space group is present in the core and the concentrations of metal elements in the shell to satisfy the above-described Expressions 1 to 4.

The lithium manganese-based oxide defined herein may be represented by Formula 1 below.

$$rLi_2MnO_3 \cdot (1-r)Li_aNi_xCo_yMn_zM1_{1-(x+y+z)}O_2 \quad \text{[Formula 1]}$$

Wherein,

M1 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0<r\leq 0.8$, $0<a\leq 1$, $0<x\leq 1$, $0\leq y<1$, $0<z<1$, and $0<x+y+z\leq 1$.

The lithium manganese-based oxide represented by Formula 1 may optionally include cobalt. In addition, when the lithium manganese-based oxide includes cobalt, the ratio of the number of moles of cobalt to the number of moles of all metal elements in the lithium manganese-based oxide may be 10% or less.

The lithium manganese-based oxide represented by Formula 1 is a composite oxide in which a C2/m phase oxide represented by $Li_2MnO_3$ and an R3-m phase oxide represented by $Li_aNi_xCo_yMn_zM1_{1-(x+y+z)}O_2$ coexist. Wherein, the C2/m phase oxide and the R3-m phase oxide are present in a state of forming a solid solution.

In addition, in the lithium manganese-based oxide represented by Formula 1, when r is more than 0.8, the proportion of $Li_2MnO_3$, which is a C2/m phase oxide, in the lithium manganese-based oxide is excessively high, so the discharge capacity of the positive electrode active material may be degraded.

Lithium Secondary Battery

According to another embodiment of the present invention, a positive electrode including a positive electrode current collector and a positive electrode active material layer formed on the positive electrode current collector may be provided. Wherein, the positive electrode active material layer may include the above-described positive electrode active material prepared by a preparation method according to various embodiments of the present invention as a positive electrode active material.

Accordingly, a detailed description of the lithium manganese-based oxide will be omitted, and only the remaining components not described above will be described below. In addition, hereinafter, the above-described lithium manganese-based oxide is referred to as a positive electrode active material for convenience.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Wherein, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Wherein, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Wherein, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to still another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to exemplify the present invention, and thus the scope of the present invention will not be construed not to be limited by these examples.

Preparation Example 1. Preparation of Positive Electrode Active Material

Example 1

(a) Preparation of Precursor

In a reactor, NaOH and $NH_4OH$ were added to a mixed aqueous solution in which $NiSO_4 \cdot 6H_2O$ and $MnSO_4 \cdot H_2O$ are mixed in a molar ratio of 25:75 and stirred. The temperature in the reactor was maintained at 45° C., and $N_2$ gas was introduced into the reactor while a precursor synthesis reaction proceeded. After the reaction was completed, washing and dehydration were performed, thereby obtaining a $Ni_{0.25}Mn_{0.75}(OH)_2$ precursor.

(b) First Thermal Treatment

After increasing the temperature of a calcination furnace with an 02 atmosphere at a rate of 2° C./min, and then maintaining the temperature at 550° C., the precursor obtained in (a) was thermally treated for 5 hours, followed by furnace cooling.

(c) Second Thermal Treatment

A mixture was prepared by mixing the oxide-state precursor obtained in (b) with LiOH (Li/(metals except Li) mol ratio=1.55) as a lithium compound.

Subsequently, after increasing the temperature of a calcination furnace with an $O_2$ atmosphere at a rate of 2° C./min, and maintaining the temperature at 900° C., the mixture was thermally treated for 8 hours and subjected to furnace cooling, thereby obtaining a positive electrode active material containing an overlithiated lithium manganese-based oxide.

As a result of ICP analysis, it was confirmed that the positive electrode active material according to Example 1 has a composition of $0.54Li_2MnO_3 \cdot 0.46 LiNi_{0.538}Mn_{0.462}O_2$.

Example 2

A positive electrode active material was prepared in the same manner as in Example 1, except that a $Ni_{0.40}Mn_{0.60}(OH)_2$ precursor was used, and LiOH was mixed (Li/(metals except Li) mol ratio=1.25) in a molar ratio of 1.25 before second thermal treatment.

As a result of ICP analysis, it was confirmed that the positive electrode active material according to Example 2 has a composition of $0.23Li_2MnO_3 \cdot 0.77 LiNi_{0.523}Mn_{0.477}O_2$.

Example 3

A positive electrode active material was prepared in the same manner as in Example 1, except that a $Ni_{0.45}Mn_{0.55}(OH)_2$ precursor was used, and LiOH was mixed (Li/(metals except Li) mol ratio=1.20) in a molar ratio of 1.20 before second thermal treatment.

As a result of ICP analysis, it was confirmed that the positive electrode active material according to Example 3 has a composition of $0.19Li_2MnO_3 \cdot 0.81 LiNi_{0.557}Mn_{0.443}O_2$.

Example 4

(a) Preparation of Precursor

In a reactor, NaOH and $NH_4OH$ were added to a mixed aqueous solution in which $NiSO_4 \cdot 6H_2O$ and $MnSO_4 \cdot H_2O$ are mixed in a molar ratio of 40:60 and stirred. The temperature in the reactor was maintained at 45° C., and $N_2$ gas was added into the reactor while a precursor synthesis reaction proceeded. After the reaction was completed, washing and dehydration were performed, thereby obtaining a $Ni_{0.40}Mn_{0.60}(OH)_2$ precursor.

(b) Precursor Coating

A $CoSO_4 \cdot 7H_2O$ aqueous solution, NaOH and $NH_4OH$ were added to the reactor in which the precursor obtained in (a) was being stirred. Wherein, $CoSO_4 \cdot 7H_2O$ was weighed so as to be 10 mol % and added. After the completion of the reaction, a coated precursor was obtained by washing and dehydration and drying at 150° C. for 14 hours.

(c) First Thermal Treatment

After increasing the temperature of a calcination furnace with an $O_2$ atmosphere at a rate of 2° C./min, and maintaining the temperature at 550° C., the precursor obtained in (b) was thermally treated for 5 hours, followed by furnace cooling.

(d) Second Thermal Treatment

A mixture was prepared by mixing the oxide-state precursor obtained in (c) with LiOH (Li/(metals except Li) mol ratio=1.25) as a lithium compound.

Subsequently, after increasing the temperature of a calcination furnace with an $O_2$ atmosphere at a rate of 2° C./min, and maintaining the temperature at 850° C., the mixture was thermally treated for 8 hours and subjected to furnace cooling, thereby obtaining a positive electrode active material containing an overlithiated lithium manganese-based oxide.

As a result of ICP analysis, it was confirmed that the positive electrode active material according to Example 4 has a composition of $0.23Li_2MnO_3 \cdot 0.77 LiNi_{0.467}Co_{0.127}Mn_{0.405}O_2$.

Comparative Example 1

A positive electrode active material was prepared in the same manner as in Example 1, except that, before second thermal treatment, LiOH was mixed in a molar ratio of 1.35 (Li/(metals except Li) mol ratio=1.35).

As a result of ICP analysis, it was confirmed that the positive electrode active material according to Comparative Example 1 has a composition of $0.36Li_2MnO_3 \cdot 0.64LiNi_{0.389}Mn_{0.611}O_2$.

Comparative Example 2

A positive electrode active material was prepared in the same manner as in Example 2, except that, before second thermal treatment, LiOH was mixed in a molar ratio of 1.50 (Li/(metals except Li) mol ratio=1.50).

As a result of ICP analysis, it was confirmed that the positive electrode active material according to Comparative Example 2 has a composition of $0.49Li_2MnO_3 \cdot 0.51LiNi_{0.793}Mn_{0.207}O_2$.

Preparation Example 2. Manufacture of Lithium Secondary Battery

A positive electrode slurry was prepared by dispersing 90 wt % of each of the positive electrode active materials prepared according to Preparation Example 1, 5.5 wt % of carbon black, and 4.5 wt % of a PVDF binder in 30 g of N-methyl-2 pyrrolidone (NMP). The positive slurry was uniformly applied on an aluminum thin film with a thickness of 15 μm and dried in vacuum at 135° C., thereby manufacturing a positive electrode for a lithium secondary battery.

The positive electrode, lithium foil as a counter electrode, and a porous polyethylene film (Celgard 2300, thickness: 25 μm) as a separator, and an electrolyte prepared by adding $LiPF_6$ at 1.15M in a solvent in which ethylene carbonate and ethyl methyl carbonate were mixed in a volume ratio of 3:7 were used to manufacture a coin cell.

Experimental Example 1. TEM Analysis of Lithium Manganese-Based Oxide

A lithium manganese-based oxide included in each positive electrode active material prepared in Preparation Example 1 was selected and subjected to cross-sectioning with a cross-section polisher (acceleration voltage: 5.0 kV, 4-hour milling), followed by obtaining a cross-sectional TEM image using a transmission electron microscope. Subsequently, the TEM image was subjected to fast Fourier transform (FFT) to form a diffraction pattern, and then subjected to indexing to confirm crystal structures in the core and shell regions of the lithium manganese-based oxide.

FIG. 1 shows the TEM analysis result of the lithium manganese-based oxide included in the positive electrode active material according to Example 4. In FIG. 1, a TEM image at a magnification of 50 nm and a TEM image at a magnification of 5 nm, enlarging a region shown in the TEM image (magnification: 50 nm), and crystal structures confirmed through FFT conversion of region A and region B of the TEM image (magnification: 5 nm) are shown.

Wherein, the crystal structure in the shell region was confirmed in a region spaced 0 to 0.03 μm apart from the outermost surface of the lithium manganese-based oxide, and the crystal structure in the core region was confirmed in a region spaced 0.12 to 0.15 μm apart from the outermost surface of the lithium manganese-based oxide.

The analysis result is shown in Table 1 below.

TABLE 1

| Classification | Core region | Shell region |
| --- | --- | --- |
| Example 1 | C2/m + R3-m | C2/m + R3-m |
| Example 2 | C2/m + R3-m | C2/m + R3-m |
| Example 3 | C2/m + R3-m | C2/m + R3-m |
| Example 4 | C2/m + R3-m | R3-m |
| Comparative Example 1 | C2/m + R3-m | C2/m + R3-m |
| Comparative Example 2 | C2/m + R3-m | C2/m + R3-m |

In addition, EDX mapping was performed on the cross-sectional TEM image of the lithium manganese-based oxide included in each positive electrode active material prepared in Preparation Example 1, and the EDX mapping result was subjected to line scanning to confirm a change in the concentration (at %) of nickel from the shell to the core of the lithium manganese-based oxide.

Wherein, the nickel concentration in the shell region was represented as an average nickel concentration (at %) based on the lithium manganese-based oxide (bulk) measured from a region spaced 0 to 0.03 μm apart from the outermost surface of the lithium manganese-based oxide and an average nickel concentration (at %) converted based on an R3-m phase of the lithium manganese-based oxide.

In addition, the nickel concentration in the core region was represented as an average nickel concentration (at %) based on the lithium manganese-based oxide (bulk) measured from a region spaced 0.12 to 0.15 μm apart from the outermost surface of the lithium manganese-based oxide and an average nickel concentration (at %) converted based on an R3-m phase of the lithium manganese-based oxide.

In addition, the nickel concentration in the middle region was represented as an average nickel concentration (at %) based on the lithium manganese-based oxide (bulk) measured from a region spaced 0.075 to 0.1 μm apart from the outermost surface of the lithium manganese-based oxide and an average nickel concentration (at %) converted based on an R3-m phase of the lithium manganese-based oxide.

Figure 2:
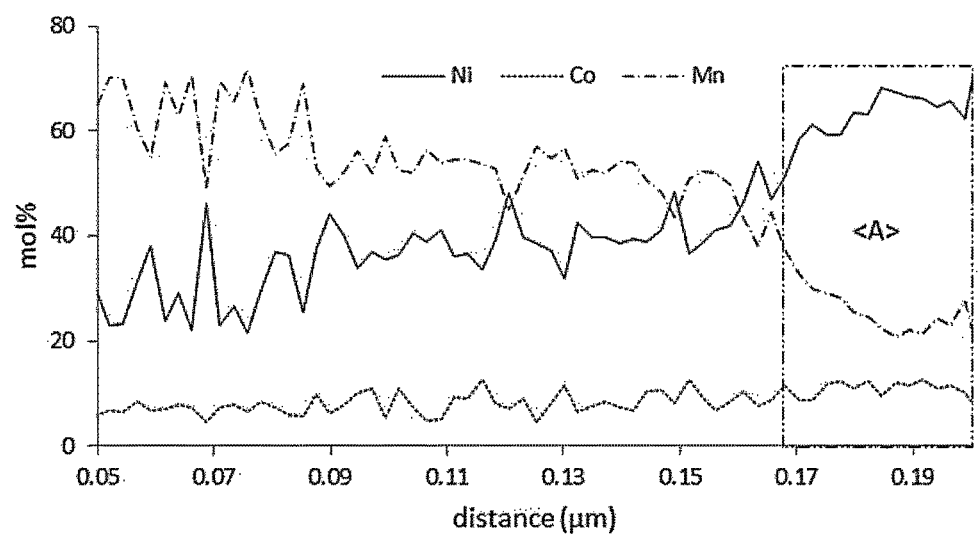
FIG. 2 shows the line sum spectrum that confirms a change in the concentration (at %) of nickel from a core to a shell of a lithium manganese-based oxide through line scanning of an EDX mapping result for a cross-sectional TEM image of the lithium manganese-based oxide included in a positive electrode active material according to Example 4. Region A shown in the line sum spectrum of FIG. 2 corresponds to region A of FIG. 1.

FIG. 2 shows the line sum spectrum that confirms a change in the concentration (at %) of nickel from a core to a shell of a lithium manganese-based oxide through line scanning of an EDX mapping result for a cross-sectional TEM image of the lithium manganese-based oxide included in a positive electrode active material according to Example 4. Region A shown in the line sum spectrum of FIG. 2 corresponds to region A of FIG. 1.

The analysis result is shown in Table 2 below.

TABLE 2

| Classification | Core region | | Middle region | | Shell region | |
| --- | --- | --- | --- | --- | --- | --- |
| | bulk | R3-m | bulk | R3-m | bulk | R3-m |
| Example 1 | 24 | 52 | 25 | 54 | 27 | 58 |
| Example 2 | 39 | 51 | 41 | 52 | 43 | 56 |
| Example 3 | 44 | 55 | 46 | 57 | 47 | 59 |
| Example 4 | 40 | 51 | 46 | 60 | 63 | 63 |
| Comparative Example 1 | 25 | 39 | 25 | 39 | 25 | 39 |
| Comparative Example 2 | 40 | 79 | 40 | 79 | 40 | 79 |

Referring to the result in Table 1, it can be confirmed that a lithium manganese-based oxide included in each positive electrode active material prepared according to Preparation Example 1 includes both a phase belonging to a C2/m space group and a phase belonging to an R3-m space group in a single particle. That is, the lithium manganese-based oxide included in each positive electrode active material prepared according to Preparation Example 1 is a solid solution represented by Formula 1 below,

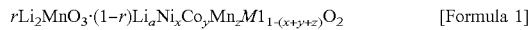

$r\text{Li}_2\text{MnO}_3 \cdot (1-r)\text{Li}_a\text{Ni}_x\text{Co}_y\text{Mn}_z M1_{1-(x+y+z)}\text{O}_2$ [Formula 1]

It can be assumed that the phase belonging to the C2/m space group in the solid solution is derived from $\text{Li}_2\text{MnO}_3$, and the phase belonging to the R3-m space group therein is derived from $\text{Li}_a\text{Ni}_x\text{Co}_y\text{Mn}_z M1_{1-(x+y+z)}\text{O}_2$. In addition, it can be confirmed that there is a region with different proportions of the phase belonging to the C2/m space group and the phase belonging to the R3-m space group, included in the lithium manganese-based oxide included in each of the positive electrode active materials according to Examples 1 to 3.

Meanwhile, referring to the results in Tables 1 and 2, in the core and shell regions of the lithium manganese-based oxide included in each of the positive electrode active materials according to Examples 1 to 3, it can be confirmed that there are a plurality of regions in which the phase belonging to the R3-m space group and the phase belonging to the C2/m space group coexist, and which have different proportions of the phase belonging to the C2/m space group and the phase belonging to the R3-m space group in the lithium manganese-based oxide.

In addition, referring to the results in Table 2 and FIG. 2, it can be confirmed that, in the core region of the lithium manganese-based oxide included in the positive electrode active material according to Example 4, the phase belonging to the C2/m space group and the phase belonging to the R3-m space group coexist, and in the shell region, only the phase belonging to the R3-m space group is present, and the nickel concentration in the lithium manganese-based oxide has a gradient that increases from the core to the shell.

Considering that, among a phase belonging to the R3-m space group and a phase belonging to the C2/m space group, which constitute the lithium manganese-based oxide, a nickel-containing phase is the phase belonging to the R3-m space group, the above result means that the proportion of the phase belonging to the R3-m space group increases from the core to the shell of the lithium manganese-based oxide. Accordingly, the ratio of the phase belonging to the R3-m space group to the phase belonging to the C2/m space group in the lithium manganese-based oxide will have a gradient that increases from the core to the shell.

In contrast, it can be confirmed that, in the core and shell of the lithium manganese-based oxide included in each of the positive electrode active materials according to Comparative Examples 1 and 2, both a phase belonging to a C2/m space group and a phase belonging to an R3-m space group coexist, and there is no significant difference between the average nickel concentration in the shell and the average nickel concentration in the core.

That is, it can be confirmed that there is no plurality of regions with different proportions of the phase belonging to the C2/m space group and a phase belonging to the R3-m space group in the lithium manganese-based oxide included in the positive electrode active materials according to Comparative Examples 1 and 2. This result means that the lithium manganese-based oxide is present in a state in which a phase belonging to a C2/m space group and a phase belonging to a R3-m space group are uniformly arranged.

Experimental Example 2. Evaluation of Electrochemical Properties of Lithium Secondary Battery A charging/discharging experiment was performed on each of the lithium secondary batteries (coin cell) manufactured in Preparation Example 2 using an electrochemical analyzer (Toyo, Toscat-3100) at 25° C. in a voltage range of 2.0V to 4.6V at a discharge rate of 0.1 C to 5.0 C to measure an initial charge capacity, an initial discharge capacity, an initial reversible efficiency, and a discharge capacity ratio.

The measurement results are shown in Tables 3 and 4 below.

TABLE 3

| Classification Units | Initial charge capacity (0.1 C-rate) mAh/g | Initial discharge capacity (0.1 C-rate) mAh/g | Initial reversible efficiency % |
| --- | --- | --- | --- |
| Example 1 | 270.3 | 218.9 | 81.0 |
| Example 2 | 254.5 | 221.1 | 86.9 |
| Example 3 | 219.7 | 193.7 | 88.1 |

TABLE 3-continued

| Classification Units | Initial charge capacity (0.1 C-rate) mAh/g | Initial discharge capacity (0.1 C-rate) mAh/g | Initial reversible efficiency % |
|---|---|---|---|
| Example 4 | 254.5 | 224.8 | 88.3 |
| Comparative Example 1 | 103.5 | 96.9 | 93.7 |
| Comparative Example 2 | 235.4 | 177.6 | 75.5 |

TABLE 4

| Classification Units | Discharge capacity rate (2 C/0.1 C) % | Discharge capacity rate (5 C/0.1 C) % |
|---|---|---|
| Example 1 | 65 | 54 |
| Example 2 | 73 | 62 |
| Example 3 | 66 | 49 |
| Example 4 | 82 | 72 |
| Comparative Example 1 | 34 | 12 |
| Comparative Example 2 | 64 | 49 |

Referring to the results in Tables 3 and 4, when there are regions having different proportions of a phase belonging to a C2/m space group and a phase belonging to an R3-m space group in a lithium manganese-based oxide, and the number of moles of nickel based on total metal elements (excluding lithium) in the phase belonging to the R3-m space group in a region in which the phase belonging to the R3-m space group is predominantly present is in a predetermined range, it can be confirmed that the discharge capacity and rate capability are improved as the degradation in stability caused by excessive amounts of lithium and manganese in the lithium manganese-based oxide is mitigated and/or prevented.

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

The invention claimed is:

1. A positive electrode active material, comprising:
an overlithiated lithium manganese-based oxide comprising at least lithium, nickel and manganese,
in which a phase belonging to a C2/m space group and a phase belonging to an R3-m space group coexist in the lithium manganese-based oxide,
wherein, in the lithium manganese-based oxide, there are regions in which a proportion of the phase belonging to the C2/m space group and the phase belonging to the R3-m space group are different,
wherein a concentration of a metal element in the lithium manganese-based oxide satisfies Expression 2 below:

$0.40 \leq M^{2'}/M^{1'} \leq 0.70$ [Expression 2]

wherein,
$M^{1'}$ is the number of moles of all metal elements (excluding lithium) in the phase belonging to the R3-m space group, and
$M^{2'}$ is the number of moles of nickel based on all metal elements (excluding lithium) in the phase belonging to the R3-m space group.

2. The positive electrode active material of claim 1, wherein a concentration of a metal element in the lithium manganese-based oxide satisfies Expression 1 below:

$0.24 \leq M^2/M^1 \leq 0.55$ [Expression 1]

Wherein,
$M^1$ is the number of moles of total metal elements (excluding lithium) in the lithium manganese-based oxide, and
$M^2$ is the number of moles of nickel based on all metal elements (excluding lithium) in the lithium manganese-based oxide.

3. The positive electrode active material of claim 1, wherein the lithium manganese-based oxide is represented by Formula 1 below:

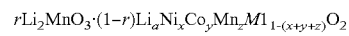

[Formula 1]

Wherein,
M1 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0 < r \leq 0.8$, $0 < a \leq 1$, $0 < x \leq 1$, $0 \leq y < 1$, $0 < z < 1$, and $0 < x+y+z \leq 1$.

4. A positive electrode comprising the positive electrode active material of claim 1.

5. A lithium secondary battery using the positive electrode of claim 4.

6. A positive electrode active material, comprising:
an overlithiated lithium manganese-based oxide comprising at least lithium, nickel and manganese,
in which a phase belonging to a C2/m space group and a phase belonging to an R3-m space group coexist in the lithium manganese-based oxide,
wherein, in the lithium manganese-based oxide, there are regions in which a proportion of the phase belonging to the C2/m space group and the phase belonging to the R3-m space group are different,
wherein the lithium manganese-based oxide comprises a core and a shell that covers at least a part of a surface of the core,
in which the phase belonging to the C2/m space group and the phase belonging to the R3-m space group coexist in the core, and
a ratio of the phase belonging to the R3-m space group to the phase belonging to the C2/m space group in the shell is higher than that in the core.

7. The positive electrode active material of claim 6, wherein a concentration of a metal element in the shell satisfies Expression 3 below:

$0.24 \leq M^4/M^3 \leq 0.75$ [Expression 3]

Wherein,
$M^3$ is the number of moles of all metal elements (excluding lithium) in the shell, and
$M^4$ is the number of moles of nickel based on all metal elements (excluding lithium) in the shell.

8. The positive electrode active material of claim 6, wherein a concentration of a metal element in the shell satisfies Expression 4 below:

$0.40 \leq M^{4'}/M^{3'} \leq 0.75$ [Expression 4]

Wherein,
$M^{3'}$ is the number of moles of all metal elements (excluding lithium) in the phase belonging to the R3-m space group in the shell, and
$M^{4'}$ is the number of moles of nickel based on all metal elements (excluding lithium) in the phase belonging to the R3-m space group in the shell.

9. The positive electrode active material of claim 6, wherein the ratio of the phase belonging to the R3-m space group to the phase belonging to the C2/m space group in the lithium manganese-based oxide has a gradient that increases from the core to the shell.

10. The positive electrode active material of claim 6, wherein there is only the phase belonging to the R3-m space group in the shell.

\* \* \* \* \*